Nov. 15, 1949          A. G. OWEN          2,488,321
POWER SUPPLY APPARATUS
Filed Feb. 8, 1947
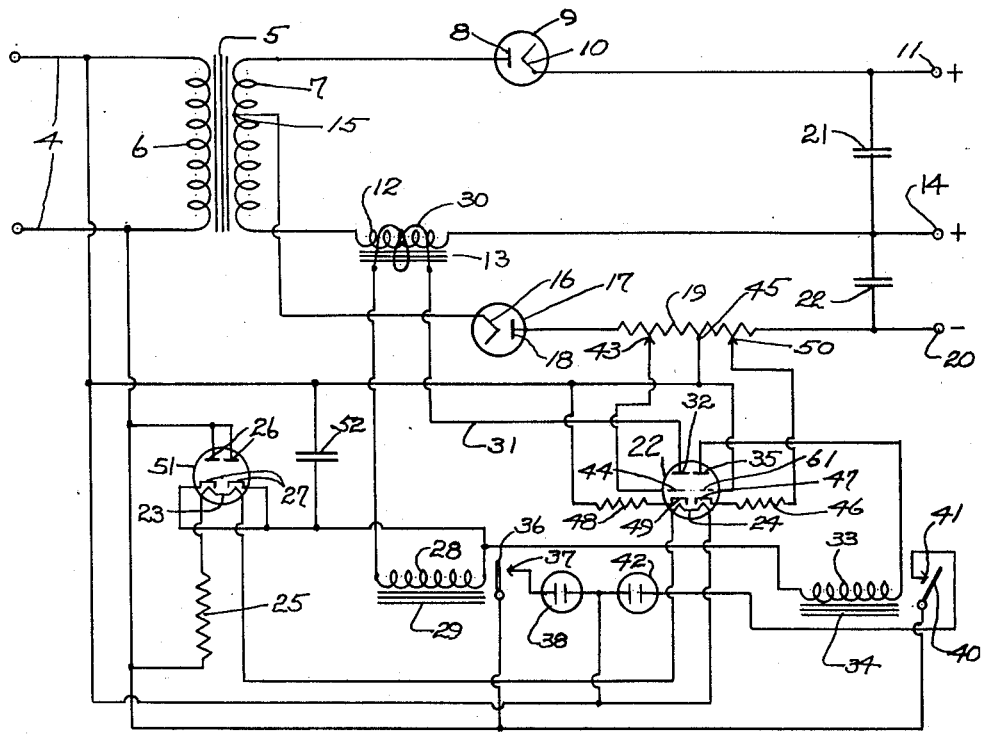
INVENTOR.
Albert G. Owen
BY Robert T. Palmer
Attorney Patented Nov. 15, 1949

2,488,321

UNITED STATES PATENT OFFICE 2,488,321

POWER SUPPLY APPARATUS

Albert G. Owen, Sharon, Mass., assignor to Westinghouse Electric Corporation, East Pittsburgh, Pa., a corporation of Pennsylvania Application February 8, 1947, Serial No. 727,439

6 Claims. (Cl. 321—25)

This invention relates to apparatus for the production of relatively high voltage, direct current from relatively low voltage, alternating current, and relates more particularly to automatic controls for such apparatus.

For energizing electric units such, for example, as electrostatic precipitators which require relatively high voltage, direct current, from relatively low voltage, alternating current lines, it is customary to provide power supply apparatus using step-up transformers and rectifiers. This invention provides for such apparatus, automatic voltage regulation; the prevention of a short-circuit across its output; and the indications of an open load circuit, and of a short-circuited load circuit.

An object of the invention is to regulate the voltage of the current delivered by power supply apparatus.

Another object of the invention is to prevent a short-circuit across the output of power supply apparatus.

Other objects of the invention are to indicate open and short-circuits in the load connected to power supply apparatus.

The invention will now be described with reference to the drawing which is a circuit schematic illustrating one embodiment of this invention.

The embodiment of the invention illustrated comprises the step-up transformer 5 which is adapted to have its primary winding 6 connected to the 117 volt, alternating current wires 4. One side of the secondary winding 7 of the transformer is connected to the anode 8 of the half-wave rectifier tube 9. The cathode 10 is connected to the high voltage, direct current terminal 11.

The other side of the secondary winding 7 is connected to one side of the winding 12 of the saturable reactor 13, the other side of the winding 12 being connected to the intermediate voltage, direct current terminal 14.

The secondary winding 7 is tapped at 15, the tap being connected to the cathode 16 of the half-wave rectifier tube 17. The anode 18 of the tube 17 is connected to one end of the resistor 19, the other end of the resistor being connected to the minus terminal 20. The condenser 21 is connected between the terminals 11 and 14, and the condenser 22 is connected between the terminals 14 and 20.

The filament cathodes of the tubes 9 and 17 could be energized by current from a filament winding which is not illustrated, of the transformer 5, or from a separate filament transformer.

The circuit described in the foregoing is a more or less conventional, full wave, voltage multiplier circuit, the tube 9 rectifying the alternating current during one half-cycle, at which time the condenser 21 charges up to the peak of the direct current voltage. The tube 17 rectifies the alternating current during the next half-cycle, at which time the condenser 22 charges up to the peak of the direct current voltage from tube 17. The condenser 21 discharges during the half-cycles the tube 17 is rectifying, and its output is delivered in series with that from the tube 17. Likewise the condenser 22 discharges during the half-cycles the tube 9 is rectifying, and its output is delivered in series with that from the tube 9. Thus the terminal 11 may supply +13,000 volts to a load, and the terminal 14 may supply +6,000 volts to the load, the negative side of the load being connected to the terminal 20.

As the current drawn by the load increases, the delivered voltage ordinarily would decrease. This invention provides a saturable reactor for maintaining the load current, and therefore the delivered voltage, constant. The saturable reactor becomes a load when a short-circuit occurs in the normal load, thus preventing a short-circuit across the output of the power supply.

The rectifier tube 51 and the dual-triode tube 54 have their filaments 23 and 24 respectively, connected in series with the voltage dropping resistor 25, to the 117 volt alternating current wires 4. The tube 51 may be a 50Z7, the tube 54 may be a 12SL7, and the resistor 25 may be 350 ohms. The anodes 26 of the rectifier tube 51 are connected together and to one of the wires 4. The cathodes 27 of the tube 51 are connected together and to one side of the winding 28 of the relay 29, the other side of the winding 28 being connected to one side of the winding 30 of the saturable reactor 13. The other side of the winding 30 is connected by the wire 31 to the anode 32 of the tube 54.

The cathodes 27 of the rectifier tube 51 are also connected to one side of the winding 33 of the relay 34, the other side of the winding 33 being connected to the anode 35 of the tube 54.

The armature 36 of the relay 29 is connected to one of the supply wires 4, and the contact 37 of the relay 29 is connected to one of the electrodes of the neon tube 38, the other electrode of the tube 38 being connected to the other of the supply wires 4. When the relay 29 releases its armature 36, a circuit is closed for lighting the tube 38 with current from the supply wires 4.

The armature 40 of the relay 34 is connected to one of the wires 4. The contact 41 of the relay 34 is connected to one of the electrodes of the neon tube 42, its other electrode being connected to the other of the supply wires 4. The armature 40 touches the contact 41 and closes a circuit lighting the lamp 42 with current from the supply wires 4 when the relay 34 is energized.

The tap 45 on the resistor 19 is connected to the control grid 44 of the tube 54, and to one end of the bias resistor 46, the other end of which is connected to the cathode 47 of the tube 54.

The slider 43 of the resistor 19 is connected to one of the supply wires 4 and to one end of the cathode bias resistor 48, the other end of which is connected to the cathode 49 of the tube 54.

The slider 50 of the resistor 19 is connected to the control grid 61 of the tube 54.

The rectifier tube 51 supplies direct current to energize the tube 54 and the relays 29 and 34. The condenser 52 filters the output of the tube 51.

In operation, the current drawn by the load connected to the terminals 11, 14 and 20 flows through the resistor 19 causing proportional voltage drops through the resistor. An increase in current to a value above normal for the load causes an increased voltage drop across the resistor, and causes an increase in the voltage between the grid 44 and the cathode 49 of the tube 54, the grid being negative and the voltage increase being an increase in the negative voltage on the grid. This causes a decrease in the current flowing from the anode 32 of the tube, through the winding 30 of the saturable reactor 13. This causes an increase in the impedance of the winding 12 of the reactor which in turn causes the load current to decrease to the normal value. Likewise a decrease in current to a value below normal for the load, causes a decreased voltage drop across the resistor 19, and causes a decrease in the voltage between the grid 44 and the cathode 49 of the tube 54. This causes an increase in the current flowing from the anode 32 of the tube through the winding 30 of the reactor 13, and causes a decrease in the impedance of the winding 12, resulting in an increase in the load current to the normal value. The slider 43 is adjustable to cause any selected current to be maintained constant. Through holding the current constant the voltage of the current is also held constant.

In case of a short-circuit in the load connected to the power supply, the increase in current caused thereby does two things. First it results in the grid 44 of the tube 54 being biased with so high a negative voltage that substantially no current will flow through the winding 30 of the reactor 13. This greatly increases the impedance of the winding 12 of the reactor causing the reactor to act as a sufficient load for greatly limiting current value. At the same time the decrease in the current from the anode 32 of the tube 54, which current flows through the relay winding 28, decreases to so low a value that the relay armature 36 is released causing it to touch the contact 37, and thereby cause the Neon lamp 38 which may be colored red, to light, indicating to an attendant that there is a short-circuit in the load.

In case an open circuit occurs, the current through the resistor 19 will decrease to zero resulting in no negative bias on the grid 61 of the tube 54, causing the tube to draw so much space current that the current flowing from its anode 35 through the relay winding 33, energizes the relay 34 causing it to pull-up its armature 40 which then touches the contact 41 causing the Neon lamp 42 which may be colored green, to light, indicating to an attendant that there is an open circuit.

The embodiment of the invention illustrated is particularly suitable for energizing electrostatic precipitators having ionizer electrodes, and separate collector electrodes such as disclosed in the G. W. Penny Patent No. 2,129,783. The ionizer electrodes would be connected to the terminals 11 and 20, which would provide a potential of 13,000 volts, for example, therebetween. One set of collector electrodes would be connected to the terminal 14 and the other to the terminal 20, which would provide a potential of 6,000 volts, for example, therebetween.

The winding 12 of the saturable reactor 13 is placed in the lead between the tapped connection on the transformer secondary winding and the intermediate voltage terminal, in which lead alternating current flows, and due to this location, but one such reactor is required for adequate voltage regulation. Thus this invention is particularly suitable for voltage multiplier circuits.

While one embodiment of the invention has been described for the purpose of illustration, it should be understood that the invention is not limited to the exact circuit and circuit components illustrated, as modifications thereof may be suggested by those skilled in the art without departure from the essence of the invention.

What is claimed is:

1. Power supply apparatus comprising a voltage step-up transformer having a secondary winding, a pair of rectifier elements each having a cathode and an anode, a pair of load supply leads, one connected to the cathode of one of said devices, the other connected to the anode of the other of said devices, a pair of condensers connected in series and to said leads, a saturable reactor having first and second coils, said winding being connected at one end to the anode of said one of said devices and at the other end to one end of said first coil, an intermediate point on said winding being connected to the cathode of the other of said devices, the other end of said first coil being connected to the mid-point connection of said condensers, a resistor connected in one of said leads, a vacuum tube having a control grid, a cathode and an anode, a source of direct current for supplying space current for said tube, said anode of said tube being connected to one end of said second coil, the other end of said second coil being connected to said source, and means connecting said grid and the cathode of said tube to said resistor whereby voltage variations thereacross vary the voltage between said grid and said cathode and vary the current flowing from said source through said second coil.

2. Power supply apparatus as claimed in claim 1 in which a relay has its energizing winding connected in series with said second coil and said source, and a signalling device is connected to said relay so as to be actuated thereby when abnormal current flows through said energizing winding.

3. Power supply apparatus as claimed in claim 1 in which an open-circuit signal device and a short-circuit signal device are provided, means including means actuated when no current is flowing through said resistor is provided for actuating said open-circuit device, and means including means responsive to an abnormally large current flowing through said resistor is provided for actuating said short-circuit device.

4. Power supply apparatus comprising a voltage step-up transformer having a secondary winding; a pair of rectifier elements each having a cathode and an anode; one element having its anode connected to said winding at one end thereof and having its cathode connected to a high potential, load supply lead; the other of said elements having its cathode connected to a tap on said winding, and having its anode connected to the negative, load supply lead; a saturable reactor having one winding connected at one end to said winding at the other end thereof, the reactor having the other end of said one winding connected to an intermediate potential, load supply lead; said reactor having a second winding inductively coupled to its other winding; means including means responsive to current flowing through one of said leads for supplying current to said second winding which is inversely proportional to said current; a relay having an energizing winding connected to said second winding so as to have current flowing therethrough which varies with the current flowing through the second winding, and a signal device actuated by said relay when a relatively high current flows through its energizing winding.

5. Power supply apparatus as claimed in claim 4 in which the means responsive to current flow is a resistor connected in the negative lead.

6. Power supply apparatus comprising a voltage step-up transformer having a secondary winding; a pair of rectifier elements, each having a cathode and an anode; a pair of load supply leads; one connected to the cathode of one of said devices, the other connected to the anode of the other of said devices, a pair of capacitors connected in series and to said leads; a saturable reactor having first and second coils; said winding being connected at one end to the anode of said one of said devices, and at the other end to one end of said first coil, the other end of said first coil being connected to the mid-point connection of said capacitors, means including means responsive to current flowing in one of said supply leads for supplying current to said second coil which varies inversely with said current; a relay having an energizing winding connected to said second coil so as to have current flowing therethrough which varies with the current flowing through said second coil, and a signal device operated by said relay when an abnormal current flows through its energizing winding.

ALBERT G. OWEN.

REFERENCES CITED

The following references are of record in the file of this patent:

UNITED STATES PATENTS

| Number | Name | Date |
| --- | --- | --- |
| 1,902,227 | Garretson | Mar. 21, 1933 |
| 2,018,348 | Dijksterhuis | Oct. 22, 1935 |
| 2,036,708 | Logan | Apr. 7, 1936 |
| 2,213,091 | Morack | Aug. 27, 1940 |
| 2,309,156 | Andrews | Jan. 26, 1943 |

OTHER REFERENCES

Shade—R. F. High Volt Supplies, pub. April 1943, No. St235 by R. C. A., page 161.